T. T. Prosser,
Circular Saw Mill.
Nº 18,860. Patented Dec. 15, 1857.
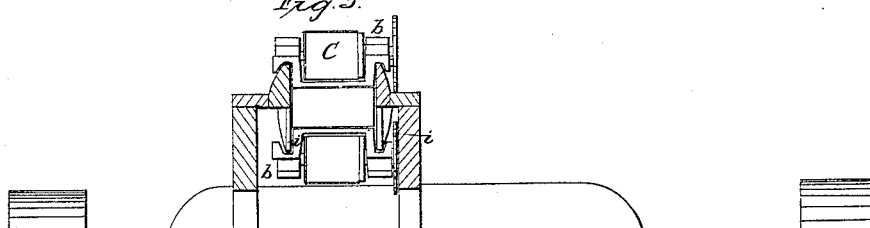
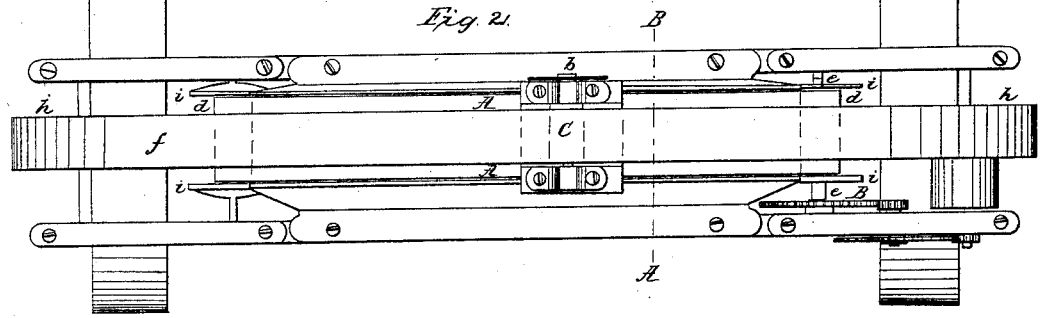
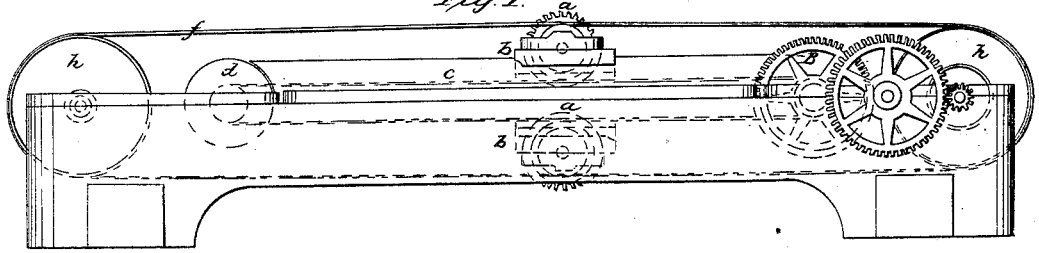

UNITED STATES PATENT OFFICE.

T. T. PROSSER, OF OCONOMOWOC, WISCONSIN.

PORTABLE SAWMILL.

Specification of Letters Patent No. 18,860, dated December 15, 1857.

*To all whom it may concern:*

Be it known that I, T. T. PROSSER, of the town of Oconomowoc, in the county of Waukesha and State of Wisconsin, have invented a new and Improved Sawing-Machine; and I do hereby declare that the following is a full and exact description, to wit.

The nature of my invention consists in attaching circular saws to a movable frame passing along a slide operated by a band and pulley for the purpose of obtaining a continuous succession of cuts, to prevent stopping and reversing machinery and avoid cutting both ways making a light durable machine and when desired portable.

To enable others skilled in the art to make and use my invention I will proceed to describe its construction and operation as shown in the drawings accompanying this specification.

No. 1 is a side view, No. 2 a top view, and No. 3 a section.

I attach circular saws Figure $1^a$, to a sliding frame Fig. $2^b$, which is fastened to an endless belt or chain as shown in dotted lines Fig. $1^c$, which passes around flanged drums or pulleys Figs. 1 and $2^{dd}$, placed at each end of slides Fig. $2^{AA}$, attached to the frame. The shaft Fig. $2^{ee}$ on which one of said drums or pulleys is placed has a cogged wheel Figs. 1 and $2^{BB}$, attached to it connecting it with gearing and receives its motion therefrom. A band Figs. 1 and $2^{ff}$, running around pulleys Figs. 1 and $2^{hh}$ at each end of the frame which receives their motion from any power which is most convenient, either horse steam or water.

The flanges Figs. 2 and $3^{ii}$, upon the drums or pulleys serve to conduct the sliding frame upon or off the slide Fig. $2^{AA}$, as may be required, these slides also serve to give the sliding frames a straight forward horizontal motion. The belt which passes around the pulley attached to the driving shaft and around the pulley at the opposite end of the frame is passing over the pulley Figs. 2 and $3^{cc}$, on the saw mandrel in the sliding frame at Fig. $2^b$, at a small angle and is not a straight line from the top of the pulley at one end to the top of the other. The object of this elevation is for the purpose of pressing hard on the pulley to keep the frame in place on the slides while it also causes the saw to revolve while passing over the slides and in use and to cease motion when passing from one flange to the other under the slides. The two sliding frames, Figs. 1 and 2 and $3^{bbbb}$, one shown partly in dotted lines are attached to the endless chain or belt at equal distances from each other and when the machine is in motion one is moving forward on top of the slide doing its work while the other is moving back under the slide ready to resume its operation of cutting when it comes into position, thus fully obtaining the object required by running the circular saws forward and returning them to their position by this peculiar method, and having fully described my mode of operating,

What I claim as my invention and desire to secure by Letters Patent is—

The peculiar method of operating circular saws by means of a sliding frame attached to a movable chain or belt in combination with the several parts which I have fully described in my specification.

T. T. PROSSER.

Attest:
JOHN S. HOLLINGSHEAD,
JOHN W. MANKIN.